United States Patent [19]

Pak

[11] 4,204,285
[45] May 27, 1980

[54] OVERFLOW PROTECTION APPARATUS

[76] Inventor: Ian T. Pak, Box 258G, R. D. No. 1 Amwell R.D., Neshanic, N.J. 08853

[21] Appl. No.: 62,061

[22] Filed: Jul. 30, 1979

[51] Int. Cl.² .................. E03D 11/02; E03D 11/18
[52] U.S. Cl. ............................................. 4/427; 4/1; 4/DIG. 15
[58] Field of Search .............. 4/427, 1, 100, DIG. 15, 4/3

[56] References Cited
U.S. PATENT DOCUMENTS

| 1,956,086 | 4/1934 | Tracy | 4/427 |
| 2,778,029 | 1/1957 | Young | 4/427 |
| 3,262,132 | 7/1966 | Mann | 4/427 |
| 4,041,557 | 8/1977 | Ringler | 4/427 |

*Primary Examiner*—Henry K. Artis
*Attorney, Agent, or Firm*—Martin Sachs

[57] ABSTRACT

An overflow protection apparatus for use with a toilet includes a bowl having an outwardly extending spout coupled by a flexible hose to a reservoir adapted to receive any excess water flowing out of the toilet. Means are also provided for closing off the water flow from the flushing source and/or the input water source so that the toilet cannot be flushed again until the cause for the overflow therein is cleared.

7 Claims, 5 Drawing Figures

OVERFLOW PROTECTION APPARATUS

BACKGROUND OF THE INVENTION

1. Field of the Invention

The present invention relates to a toilet which includes a bowl and water flushing source operatively coupled together, and in particular, relates to a means for protecting the surrounding area from water damage should the bowl overflow.

2. Description of the Relevant Art

Although a toilet including a bowl and water flushing source have been in use for many years the Applicant is unaware of any type of protection operating therewith to prevent the overflow of water from the bowl should it become clogged for any reason. The overflow of water to the surrounding floor area frequently causes excessive damage, especially when the flushing apparatus is activated more than once in an attempt to overcome the blockage therein. One of the objects of the present invention is to provide a simple apparatus for protecting the surrounding floors should the bowl overflow because of a blockage therein.

Another object of the present invention is to provide a means for indicating when the overflow water has reached a predetermined level in an auxiliary container utilized therefor.

A further object of the present invention is to provide a means for preventing the flow of water into the toilet bowl when the overflow therefrom has reached a certain water level.

Another object of the present invention is to provide a simple overflow protection device which may be repeatedly used and may be readily re-set once activated.

SUMMARY OF THE INVENTION

An overflow protection apparatus for use with a toilet including a bowl and water flushing source operatively coupled together providing a water flow path therebetween and a water input flow path for said flushing source, according to the principles of the present invention, comprises in combination, a bowl having an outwardly extending spout with an exit level disposed below the surface of said bowl, and including an inlet aperture for receiving the water from the flushing source. Also included, is an auxiliary reservoir disposed proximate the bowl which is provided with an inlet orifice. The bowl has a capacity approximately equal to the amount of water provided by the flushing source in one flush. A flexible coupling means is also provided and is connected between the bowl spout and the reservoir inlet orifice to provide a continuous water flow path.

The subject matter which I regard as my invention is particularly pointed out and distinctly claimed in the concluding portion of the specification. My invention, itself, however both as to its organization and method of operation, together with further objects and advantages thereof may best be understood by reference to the following description taken in connection with the accompanying drawing.

DESCRIPTION OF THE PREFERRED EMBODIMENTS

Figure 1:
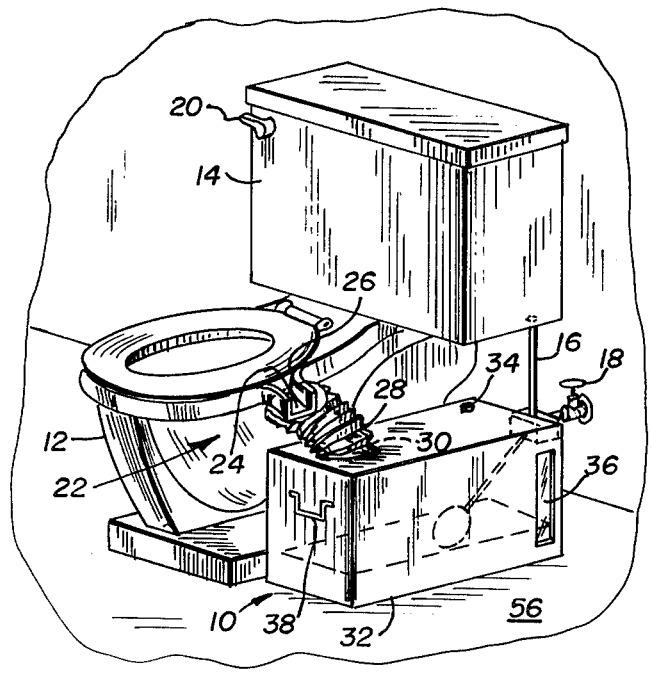
FIG. 1 is a pictorial representation of a toilet including a bowl and water flushing source coupled to an auxiliary reservoir, in accordance with the principles of the instant invention.

Referring now to the figures, and in particular FIG. 1, which discloses an overflow protection apparatus 10 coupled to a toilet that includes a bowl 12 and a water flushing source or tank 14 conventionally found coupled thereto. The tank 14 is of conventional design and has coupled thereto by means of a water pipe 16 and valve 18 the normal source of water used for flushing the contents in the bowl 12. The tank 14 is provided with a conventional type of trip handle 20 disposed in the upper lefthand corner thereof. The tank, water input line and valve associated therewith are conventional as well as the shut-off apparatus found in the tank and will not be described any further herein.

Although the tank is shown in FIG. 1 as appearing directly above and proximate to the toilet bowl, it is understood that a tank located at a remote position or a pressure type of system which uses a conventional check valve may also be utilized with the present invention.

The bowl 12 is provided with an outwardly extending spout 22 which provided a liquid exit level below the upper surface of the bowl. The surface 24 of the spout 22 is preferably elongated and provided with vertically extending walls 26 forming a channel. This is preferred since an aperture would more readily become clogged whereas an open spout forming a channel as described would be more effective to handle any overflow and small debris which may be floating in the overflow water.

The spout is provided with sufficient outwardly extending surface area to permit a flexible coupling 28 to be connected thereto by either frictional forces or a conventional clamping arrangement, not shown, may be utilized. The other end of the flexible coupling 28 is connected to an inlet orifice provided on the upper surface of an auxiliary reservoir 32 which is disposed, preferably, alongside the bowl 12. Alternately, the reservoir 32 may be placed behind the bowl and beneath the tank 14 if sufficient space is available at the particular installation of the toilet. Although the spout 22 is shown extending outwardly from one side of the bowl 12 it is contemplated that its location may be at any convenient position on the periphery of the bowl depending on the available space at a particular installation.

The reservoir 32 is preferably provided with an air vent 34 which permits the air therein to escape as liquid enters the container. A window 36 may be provided in the reservoir 32 to indicate the level of the water therein at any particular time. If the water should be above an acceptable level, a person observing the water level may readily disconnect the flexible coupling and empty the contents of the reservoir 32 so that it will be ready for use again. Handles 38 are disposed on the end walls of the reservoir 12 and aid in the positioning and removal of the water therefrom.

Figure 2:
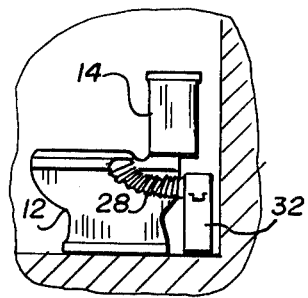
FIG. 2 is a side view in elevation of the apparatus of FIG. 1 with the auxiliary reservoir placed behind the bowl instead of alongside it.

FIG. 2 shows the reservoir 32 placed behind the bowl 12 in an inconspicuous, out of the way position.

Figure 3:
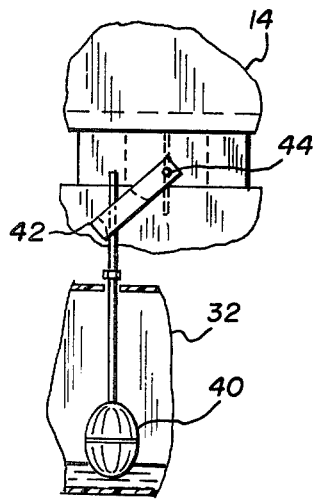
FIG. 3 is a partial enlarged view of a particular embodiment of a float and activating means connected to a valve in the water flow path to the toilet bowl.
Figure 4:
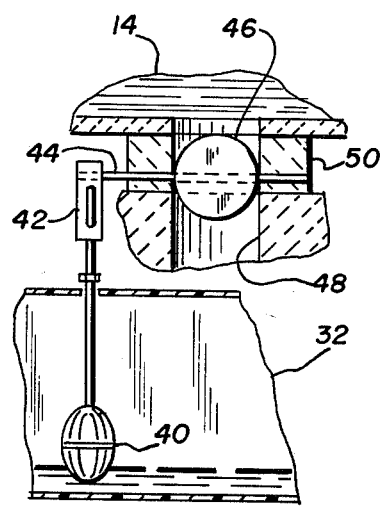
FIG. 4 is an enlarged partial view in cross-section of the shut-off valve and float shown in FIG. 3.

FIG. 3 shows a conventional float mechanism 40 disposed in the reservoir 32. The float mechanism 40 has coupled to its shaft a lever 42. Float mechanism 40, in a conventional manner, will exercise a force on lever 42 causing it to rotate output shaft 44 which will cause flap valve 46 mounted on shaft 44 to rotate therewith and close off the opening 48 in the fluid flow path to the bowl 12. The housing 50 for the output shaft 44 and flap valve 46 may be provided in a separate assembly capable of being connected to the output of a conventional water tank, with the connection presently made to the tank connected to the bottom or underside of the housing 50 in a conventional manner.

Figure 5:
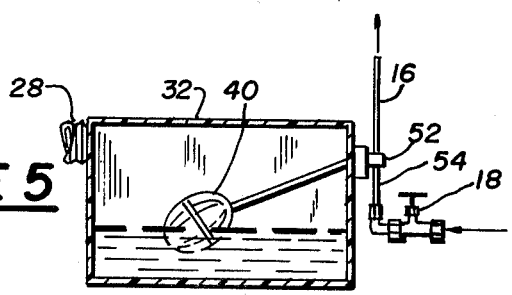
FIG. 5 is an alternate embodiment of a float and shut-off valve utilized with the auxiliary reservoir to shut off the water input flow path to the flushing source.

FIG. 5 discloses an alternate arrangement wherein the reservoir 32 has incorporated therein a float mechanism 40 which is coupled to a valve assembly 52 disposed on a side wall of the reservoir 32 and is coupled, preferably by copper tubing, to the input water valve 18 conventionally found connected to water tanks 14. The tubing 54 is connected to the valve 52 and then in turn to the input tubing or pipe 16 in the same manner as shown in FIG. 1.

In operation, if the water in the bowl 12 should reach above the level of the surface 24 of spout 22 it would overflow, via the flexible coupling, 28 and enter the inlet orifice 30 of the reservoir 32 and would proceed to fill up reservoir 32. The water entering the reservoir causes the float mechanism 40 to move in an upwardly direction which in turn causes it to move lever 42, as shown in FIG. 3 or activate valve 52 as shown in FIG. 5, thereby cutting off the flow of water from the tank 14 into bowl 12 or, alternatively, cutting off the flow of water coming from the water source into the tank 14. Either one of these actions would prevent further water from entering the bowl and therefore overflowing and entering into the reservoir.

An individual attempting to activate the trip handle 20 a second time to try and use water dislodge the blockage in the bowl 12 would be unable to have any additional water flow, thus protecting the surface or floor area 56 surrounding the toilet from becoming water logged and damaged. A person being unable to use the flushing mechanism would view the window 36 in the reservoir 32 and determine the level of water therein. Upon observing that the water level exceeds the safe level, as indicated by the fact that no additional water is able to flow into the bowl would turn off valve 18 preventing any additional water inflow into the system and proceed to empty the reservoir 32 into another draim system. Once the reservoir has been completely emptied, it is returned to its regular position beside the bowl and connected to the spout as described hereinbefore and is ready for operation again. Valve 18 is then opened filling the tank 14 with water and the system is be ready for use again. If the blockage had not been removed from the bowl at the time the reservoir 32 was emptied the reservoir would again come into play if the trip handle were activated a second time, thus protecting the floor 56 again. Once elimination of the blockage has been accomplished, the reservoir emptied, the operation of the system as a safety and overflow protection apparatus for the bowl is accomplished.

Hereinbefore has been described an overflow apparatus for use with a toilet, which includes a bowl and water flushing source. It will be understood that the various changes in the details, materials, arrangement of parts and operating conditions which have been herein described and illustrated in order to explain the nature of the invention may be made by those skilled in the art within the principles and scope of the invention.

Having thus set forth the nature of the invention, what is claimed is:

1. An overflow protection apparatus for use with a toilet including a bowl and water flushing source operatively coupled together providing a water flow path therebetween and a water input flow path for said flushing source comprising, in combination:
   (a) a bowl having an outwardly extending spout with an exit level disposed below the upper surface of said bowl and including an inlet aperture for receiving said water from said flushing source;
   (b) an auxiliary reservoir disposed proximate said bowl and being provided with an inlet orifice, said reservoir having a capacity approximately equal to the amount of water provided by said flushing source in one flush; and
   (c) flexible coupling means connected between said bowl spout and said reservoir inlet orifice to provide a continuous water flow path.

2. An overflow protection apparatus according to claim 1 further including means for stopping the water flow into said bowl from said flushing source.

3. An overflow protection apparatus according to claim 1 further including means for stopping the water flow in said flushing source input flow path.

4. An overflow protection apparatus according to claims 2 or 3 wherein said means for stopping said water flow includes a float mechanism disposed in said reservoir, a shut-off valve in said water flow path, and coupling means between said float mechanism and said valve for activating said shut-off valve when said water in said reservoir reaches a predetermined level.

5. An overflow protection apparatus according to claim 1 wherein said reservoir is provided with indicating means for indicating when said water has reached a predetermined level therein.

6. An overflow protection apparatus according to claim 1 wherein said reservoir is provided with handle means for ease in moving and lifting said reservoir when emptying said water therefrom.

7. An overflow protection apparatus according to claim 1 wherein said reservoir means is provided with venting means disposed above maximum water level expected therein.

* * * * *